March 16, 1954 H. H. SCHULZ 2,672,506

MOUNTING FOR TELEVISION RECEIVING SETS

Filed Feb. 17, 1951

Inventor
Herbert H. Schulz
By Philip A. Friedell
Attorney

Patented Mar. 16, 1954

2,672,506

UNITED STATES PATENT OFFICE 2,672,506

MOUNTING FOR TELEVISION RECEIVING SETS

Herbert H. Schulz, Oakland, Calif.

Application February 17, 1951, Serial No. 211,492

7 Claims. (Cl. 178—7.5)

This invention relates to improvements in the mounting of television receivers, and provides a new method of mounting which eliminates the space required in a room for the conventional television receiver, and also provides a mounting which permits instant removal of the receiver from its mounting coupled with automatic disconnection of electrical circuits, for repair or replacement of the receiver, and when replaced the receiver is automatically aligned, locked in position and connected in circuit, ready for operation, and, the receiver is located in a position where observers in successive rows can clearly see the television screen.

Television receivers are now manufactured in console and table models. Either of these are located too low for persons in more than one transverse row from clearly seeing the television screen. This invention includes the locating of the television set in the wall of a room at a height where persons in successive transverse rows can all clearly see the screen, and this requires a height of not less than five feet from the floor to the center of the screen. By locating the set in the wall of a room, considerable space is saved in the room because of elimination of the console or the table on which a table model is located, and eliminates all electric extension cords and antenna lead-ins, thus eliminating all hazards, with no possibility of the set becoming disconnected, the elimination of the obstructionism of the cabinet and connecting wires, and the possibility of short circuits because of broken or worn wires.

The objects and advantages of the invention are as follows:

First, to provide a method of mounting television receivers by which the television screen is made fully observable to persons in a plurality of successive rows, over the heads of the observers in the frontal rows.

Second, to provide a method as outlined which provides a greater distance range for observation of the screen.

Third, to provide a television receiver which is mounted in a wall of a room to eliminate obstructions in the room including extension cords and lead-ins, and eliminate the possibility of short circuits.

Fourth, to provide a mounting as outlined with which the television receiving set is located and automatically locked in place with circuits automatically connected, and which is automatically released and circuits disconnected when the receiver is removed.

Fifth, to provide a mounting as outlined with guiding means for positive location of the receiver and with the guiding means automatically compensating for expansion or contraction of the wall or receiver.

Sixth, to provide mounting means as outlined which is simple in construction, economical to manufacture and easy to install.

In describing the invention reference will be had to the accompanying drawings, in which.

Figure 1:
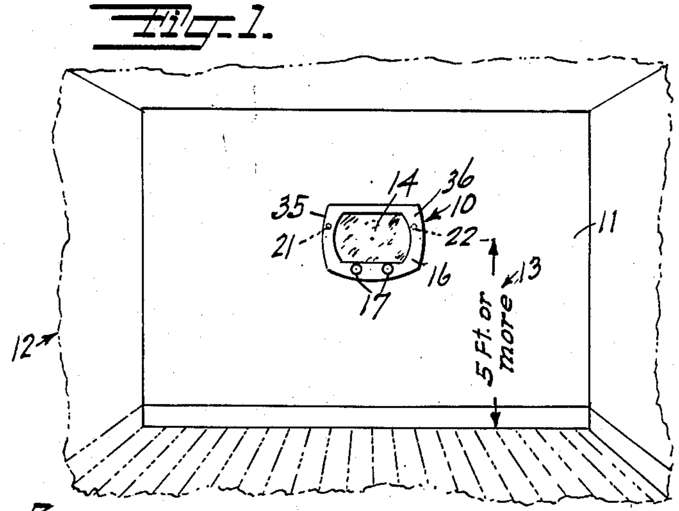
Fig. 1 illustrates one wall of a room with a television receiver installed therein.

The invention consists in mounting a television receiver 10 in the wall 11 of a room 12 so that the space ordinarily required for the console or cabinet is available for other uses, and so that extension cords and lead-ins may also be eliminated from the room to thereby eliminate the possibility of short circuits, disconnections, with their obstructionism. The receiver is preferably mounted at a height of at least five feet above the floor as indicated at 13 so that the television screen 14 can be viewed from greater distances and over the heads of frontal observers.

The television receiver includes a cabinet 15, panel 16, the television screen 14, and controls 17. This cabinet is set in a receptacle 18 having surrounding walls 19. The rearward side 20 of the panel may be either flush with the wall 11 or may protrude as may be desired.

The preferred mounting means, from both, the standpoint of simplicity and of safety includes a pair of combination guides, locking means and circuit connecting means indicated at 21 and 22, each of which consists of a tubular member 23 which is fixed to the panel 16 as indicated at 24 and having a plug connector 25 secured in its outer terminal end with leads 26 and 27 leading therefrom to and through a tunnel 28 and thence to the inner circuit of the receiver, this plug being fixed in some suitable manner such as by screws 29. A leaf spring 30 has its upper end fixed to the inside of the tube by suitable means such as riveting as indicated at 31, with the other end free and projecting beyond the fixed end of the tube, and this spring is provided with a latch 32 intermediate its length which operates through a hole 33 formed through the wall of this tube.

The panel 16 has a recess 34 formed in two opposite under edges, preferably in the two sides 35 and 36 in which a plate 37 is slidable, and this plate has an integral plunger 38 which slidably operates in the tunnel 28 and extends to the inside of the tube 23 and has a stop member 39 which cooperates with the inside of this tube to limit the outward movement of the plate 37; the spring 30 urging the plunger to normally maintain the plate even with the edge of the panel.

A support tube 40 is provided for each side of the receiver and terminates in an outer flared end as indicated at 41 and at its inner end has a socket 42 fixedly mounted for cooperation with the plug 25. A locking hole 43 is formed in the side wall for engagement of the latch 32. The circuit wires 44 for electric current and aerial and ground are connected in the sockets 42.

One of these support tubes is fixedly mounted on one wall of the receptacle as indicated at 45 and is therefore relatively immovable, while the other support tube is floatable transversely only, in a bracket 46 and secured against axial movement by collars 47 and 48 which are fixed to the tube, and at least one of which, or the tube, is provided with keying means 49 to maintain the tube against rotation.

Figures 2, 3, 4, 5:
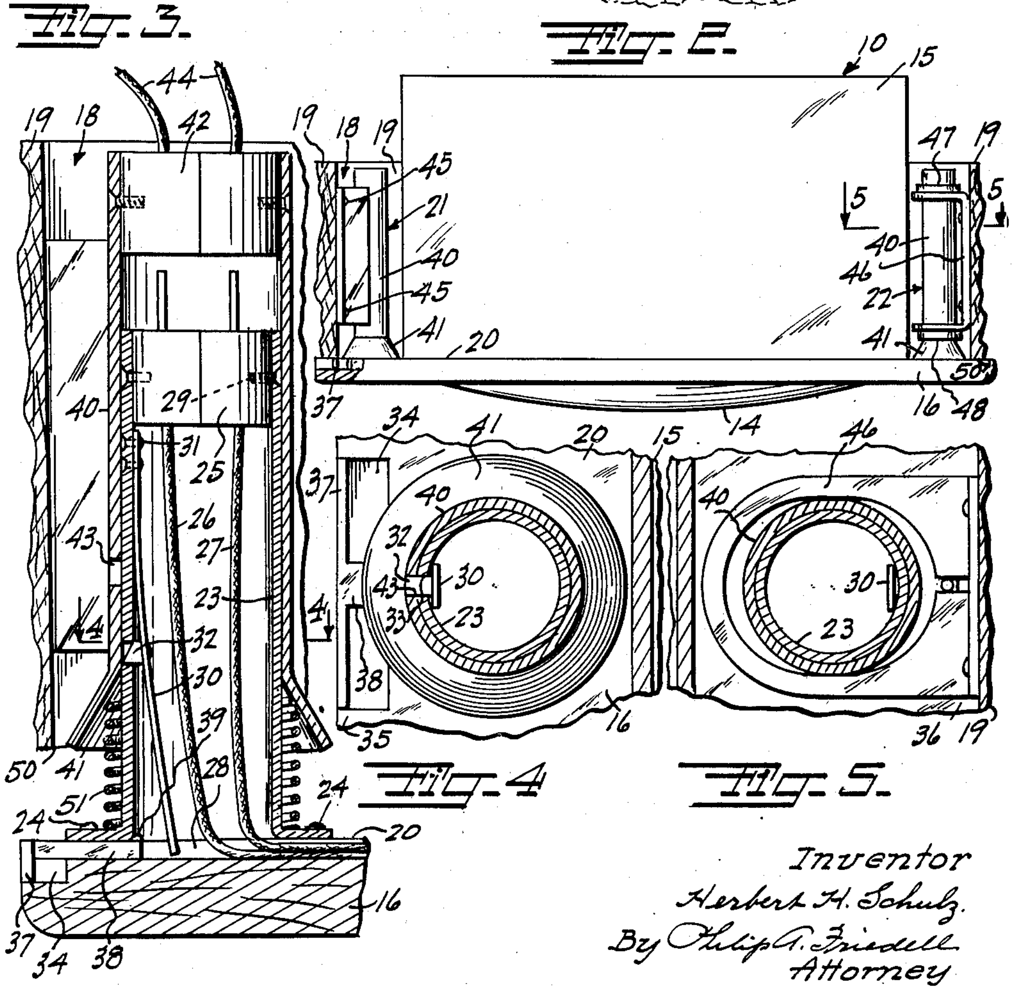
Fig. 2 is an enlarged bottom plan view of the television receiver with the automatic guiding, locking, and circuit making and breaking mechanism as installed.
Fig. 3 is an enlarged horizontal section through the automatic guiding, locking, and circuit breaking unit, in partly closed position.
Fig. 4 is a section taken on line 4—4 of Fig. 3.
Fig. 5 is an enlarged section taken on line 5—5 of Fig. 2.

The operation of the invention is as follows: As illustrated in Fig. 3, the television receiver is being replaced, under which conditions it is unnecessary to depress the plungers 38. In starting the receiver into its mounting, the ends of the tubes 23 are started into the tubes 40, the funnel ends facilitating this procedure, as the tube will automatically center in the fixed support tube, and will likewise center the other tube, moving the floating tube into alignment with its tube 23. The receiver is then merely pushed into position until the panel reaches the end 50 of the wall, the ends of the funnels being mounted in alignment with the front of the walls of the receptacle. As will be seen in Fig. 3, when this position is reached, the plug 25 will have entered the socket 42 and completed the circuits and the latch 32 will have engaged in the opening 43, thus locking the receiver in position ready for operation. If the receiver is to be removed for repairs the fingers of the two hands are gripped under the panel at the plates 37 which pushes these plates in, leaving a recess for the fingers, and simultaneously the plungers 38 force the spring back and release the latch. By pulling out on the panel, the plugs are disconnected from the sockets, breaking the circuits while both are still enclosed within the tubes, thus providing absolute safety against shock or short circuits. The spring 51 urges the panel outward to prevent any possibility of chatter or vibration in the event the latch does not fit accurately in the holes. In the event a connection is to be made while the receiver is removed from its receptacle, extension cords with a tube and plug at one end similar to 23 and 25, and a socket like 42 at the other end can be used, and with absolute safety as the plug 42 cannot otherwise be reached except through such or similar means.

Thus an installation is provided which saves room space, provides more perfect observation for more people and for greater distances, eliminates all cords and wires in the room, prevents possible wire breakage, short circuits, and assures absolute safety, and further provides an installation which is instantly removable and replaceable, and which is automatically locked when replaced, and in which the circuits are automatically made and broken under absolutely safe conditions.

I claim:

1. Means for mounting a television receiver in a receptacle having walls, comprising combined guiding, locating, and support means including a first and a second tubular member fixedly mounted on the back of said receiver, a third and a fourth tubular member mounted respectively on opposite walls of said receptacle with one fixed in position and the other transversely floatable and both terminating in flared outer ends for guiding, centering and spacing and ease of insertion, and with said first and second tubular members slidable in said third and fourth tubular members with the floatable member compensating for expansion and contraction between the receiver and the walls of the receptacle.

2. Means for mounting an electronic receiving set in a receptacle having walls, comprising combined guiding, locating, and support means including a first and a second tubular member fixedly mounted on said receiver, a third and a fourth tubular member mounted respectively on opposite walls of said receptacle with one fixed in position and the other transversely floatable and both terminating in flared outer ends for mutual centering and aligning, and with said first and second tubular members slidable in said third and fourth tubular members with the floatable member compensating for expansion and contraction between the receiver and the walls of the receptacle; said combined guiding, locating and support means, and said cooperative guiding and support means including cooperative circuit making and breaking means for making circuit when the receiver is urged to its final mounted position within the receptacle, and for breaking the circuit with initial withdrawal of the receiver from the receptacle.

3. A structure as defined in claim 2; releasable means comprising spring urged latch means cooperative between said first and second, and said third and fourth tubular members; said receiver having a panel, and recesses formed at opposite ends in the back surface of said panel, and a finger cooperative member in each recess and cooperating with said spring urged latch means for releasing said latch means at will for removal of said receiver from said receptacle.

4. Means for mounting an electronic device in a receptacle having encompassing walls, and said receiver having a panel, comprising; a fixed tubular member mounted on each end of said panel and projecting rearwardly, a second tubular member fixedly mounted on one wall of said receptacle, and a third tubular member transversely floatably mounted on an opposite wall of said receptacle, said second and third tubular members terminating in flared outer ends for guiding said fixed tubular members, with said fixed tubular members slidable in said second and third tubular members, and latching means cooperative between said fixed tubular members and said second and third tubular members for locking said members together, and manually releasable means mounted in recesses formed in the back of said panel and cooperative with said latching means for release at will.

5. A structure as defined in claim 4; said receiver having a connecting plug fixed in the inner end of each of said fixed tubular members, and a connecting socket in the inner end of each said second and third tubular members for cooperation with said plugs for completing circuits when the receiving set is urged to its final mounting position, and breaking circuit when the receiving set is retracted.

6. A structure as defined in claim 4; said latching means comprising registrable holes formed through the walls of the respective fixed, and said second and third tubular members, a latch slidable through said holes when in registry, and a leaf spring having its inner end fixed to the inside of the wall of each fixed tubular member and its outer end free and projecting into a tunnel provided in the back face of the panel, with the latch mounted intermediate the length of the leaf spring, a finger recess formed in the back side from each of two opposite edges of the panel, and a plunger normally closing the outer end of said recess and normally flush with the end face thereof and cooperating with the free end of said spring, insertion of the fingers of the hand causing depression of said plungers for releasing the latches from the registered holes with said recesses simultaneously providing a finger hold at each edge of the panel for removal of the receiver from the receptacle.

7. A structure as defined in claim 4; said receiver having circuit connections passing within said fixed tubular members and terminating in connecting plugs fixed in the inner ends of said fixed tubular members, and external circuits terminating in connecting sockets in the inner ends of said second and third tubular members for completing the circuits when the receiving set is urged to its final mounting position, and breaking circuit when the receiving set is retracted; said latching means comprising registrable holes formed through the walls of the respective fixed, and second and third tubular members, a latch slidable through the holes in registry and a leaf spring having its inner end fixed to the inside of the wall of each fixed tubular member and its outer end free and projecting into a tunnel provided in the back face of the panel, with the latch mounted intermediate the length of the spring, a finger recess formed in the back side from each of two opposite edges of the panel, and a plunger normally closing the outer end of said recess and normally flush with the end face thereof and cooperating with the free end of said spring, insertion of the fingers of a hand in said recesses causing depression of said plungers for releasing the latches with said recesses simultaneously providing a finger hold at each edge of the panel, whereby the receiver is automatically aligned and locked in position and all circuits completed through insertion of the receiver in the receptacle and urging to final mounting position, and the circuits are automatically broken when the receiver is released and retracted.

HERBERT H. SCHULZ.

References Cited in the file of this patent

UNITED STATES PATENTS

| Number | Name | Date |
|---|---|---|
| 1,748,482 | Horton | Feb. 25, 1930 |
| 2,543,146 | Bace | Feb. 27, 1951 |
| 2,560,320 | Winkler | July 10, 1951 |

FOREIGN PATENTS

| Number | Country | Date |
|---|---|---|
| 469,289 | Great Britain | July 22, 1937 |

OTHER REFERENCES

Radio and Television News, November 1948 (cover page).

Tele-Tech, October 1947, page 57.